(12) United States Patent
Kaya et al.

(10) Patent No.: US 11,224,879 B2
(45) Date of Patent: Jan. 18, 2022

(54) INSPECTION CHIP AND INSPECTION SYSTEM

(71) Applicant: Konica Minolta, Inc., Tokyo (JP)

(72) Inventors: Takatoshi Kaya, Inagi (JP); Tomonori Kaneko, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 282 days.

(21) Appl. No.: 16/482,293

(22) PCT Filed: Feb. 6, 2018

(86) PCT No.: PCT/JP2018/003968
§ 371 (c)(1),
(2) Date: Jul. 31, 2019

(87) PCT Pub. No.: WO2018/150944
PCT Pub. Date: Aug. 23, 2018

(65) Prior Publication Data
US 2019/0344261 A1 Nov. 14, 2019

(30) Foreign Application Priority Data

Feb. 15, 2017 (JP) .............................. JP2017-025823

(51) Int. Cl.
*B01L 3/00* (2006.01)
*G01N 21/01* (2006.01)
(Continued)

(52) U.S. Cl.
CPC .............. *B01L 3/508* (2013.01); *G01N 21/01* (2013.01); *G01N 21/6428* (2013.01);
(Continued)

(58) Field of Classification Search
CPC .................. B01L 3/508; B01L 3/5082; G01N 2021/0378; G01N 2021/6482;
(Continued)

(56) References Cited

U.S. PATENT DOCUMENTS 4,979,821 A  12/1990 Schutt et al.
5,318,748 A   6/1994 Babson et al.
(Continued)

FOREIGN PATENT DOCUMENTS

EP  0163063 A2 * 12/1985 ............. G01N 21/07
JP  5865713 B2 *  2/2016 ............. G01N 35/02
(Continued)

OTHER PUBLICATIONS

Maruyama ( translation of JP 5865713) (Year: 2016).*
Shigeru ( translation of JP WO2012/105171) (Year: 2012).*
European Patent Application No. 18754183.4; Extended Search Report; dated Dec. 18, 2019; 8 pages.
Written Opinion issued in PCT Appln. No. PCT/JP2018/003968 dated May 15, 2018.

*Primary Examiner* — Jennifer Wecker
*Assistant Examiner* — Jonathan Bortoli
(74) *Attorney, Agent, or Firm* — BakerHostetler

(57) ABSTRACT

An inspection chip according to the present invention is an inspection chip for stirring liquid by a circular movement of a bottom surface end, including a well main body for accommodating the liquid and a side wall member arranged on a side surface of the well main body. The bottom surface end has a bottom surface structure in contact with a rotating member for allowing the bottom surface end to perform the circular movement in a position leaning from a center line of the well main body toward the side wall member.

20 Claims, 9 Drawing Sheets

(51) Int. Cl.
*G01N 21/64* (2006.01)
*G01N 21/65* (2006.01)

(52) U.S. Cl.
CPC ...... *G01N 21/658* (2013.01); *B01L 2200/025* (2013.01); *B01L 2200/06* (2013.01); *B01L 2200/14* (2013.01); *B01L 2300/06* (2013.01); *B01L 2300/0627* (2013.01); *B01L 2300/0832* (2013.01); *B01L 2300/0851* (2013.01); *B01L 2300/0858* (2013.01); *B01L 2300/12* (2013.01); *B01L 2300/16* (2013.01); *B01L 2300/168* (2013.01); *G01N 2201/023* (2013.01); *G01N 2201/0638* (2013.01)

(58) Field of Classification Search
CPC .... G01N 21/01; G01N 21/03; G01N 21/6428; G01N 21/648; G01N 21/658; G01N 2201/023; G01N 2201/0638; G01N 35/02
See application file for complete search history.

(56) References Cited

U.S. PATENT DOCUMENTS

2009/0296083 A1    12/2009  Saaski et al.
2011/0129942 A1*    6/2011  Ohtsuka ............... G01N 21/648
                                                 436/501

FOREIGN PATENT DOCUMENTS

| WO | WO-2012105171 A1 * | 8/2012 | ......... G01N 35/1079 |
| WO | 2012/0157403 | 11/2012 | |
| WO | 2018/0021238 | 2/2018 | |

* cited by examiner

INSPECTION CHIP AND INSPECTION SYSTEM

The present U.S. Patent Application is a U.S. National Phase Application under 35 U.S.C. 371 of International Application No. PCT/JP2018/003968 filed on Feb. 6, 2018. This application claims priority to Japanese Patent Application No. 2017-025823 filed on Feb. 15, 2017, which is incorporated herein by reference in its entirety.

TECHNICAL FIELD

The present invention relates to an inspection chip including a structure on a side surface thereof. The present invention also relates to an inspection system using an inspection chip including the structure on the side surface thereof.

BACKGROUND ART

In biochemical inspection, biochemical reactions such as antigen-antibody reactions are used. For example, in fluoro-immunoassay (FIA), a labeling substance containing a fluorescent substance is bound to a substance to be detected (antigen), and the substance to be detected is labeled with fluorescence. Thereafter, the substance to be detected labeled with the fluorescence is irradiated with excitation light, fluorescence emitted from the fluorescent substance is detected, and an amount of the substance to be detected and the like is specified from intensity of the fluorescence. Among such FIAs, surface plasmon-field enhanced fluorescence spectroscopy (SPFS) is known as a method capable of detecting the substance to be detected with an especially high degree of sensitivity.

In the SPFS, a first capturing body (for example, a primary antibody) which specifically binds to the substance to be detected is immobilized on a metal film to form a reaction site for capturing the substance to be detected. For example, Patent Literature 1 discloses an SPFS device provided with a well-type inspection chip (sensor structure 22) in which a reaction site is arranged on a bottom surface of a well (bottomed concave portion for accommodating liquid). In the inspection chip, the well is formed by fixing a well member having a through hole on a metal film formed on a light transmissive dielectric member, and the reaction site is arranged on the metal film forming the bottom surface of the well. Then, by introducing a specimen (sample and the like) which may contain the substance to be detected into this well, the substance to be detected is bound to the first capturing body immobilized on the metal film and forming the reaction site. Then, a second capturing body is further bound to the substance to be detected bound to the first capturing body by introducing the second capturing body labeled with fluorescence (for example, a secondary antibody) into the well. That is, the substance to be detected is indirectly labeled with fluorescence. When the metal film is irradiated with the excitation light from a side of a dielectric member in this state, the fluorescent substance is excited by an electric field enhanced by surface plasmon resonance (SPR) to emit fluorescence. In the SPFS device disclosed in Patent Literature 1, the fluorescence emitted from the fluorescent substance passes through a liquid surface of the liquid in the well and is detected by a detection unit arranged above the well.

CITATION LIST

Patent Literature

Patent Literature 1: WO 2012/157403 A

SUMMARY OF INVENTION

Technical Problem

As described above, in the inspection chip disclosed in Patent Literature 1, since the metal film is formed on the bottom surface of the well and the reaction site is arranged, a tip end of a liquid delivery tool might be in contact with the metal film or the reaction site to break them when removing liquid such as a reagent in the well. Therefore, the tip end of the liquid delivery tool cannot be pressed against the bottom surface of the well, and it is difficult to sufficiently remove the liquid in the well. Then, if the liquid such as the reagent is not removed sufficiently and remains in the well, various reactions do not proceed properly, and detection accuracy is lowered.

In addition, as described above, in the SPFS device disclosed in Patent Literature 1, a detection unit is arranged above the well and detects fluorescence which passes through the liquid surface of the liquid in the well, so that a detection result of the fluorescence might be affected by meniscus, air bubbles present on the liquid surface or the like. If the detection result of the fluorescence is affected by the meniscus, the air bubbles or the like, the detection accuracy is lowered.

That is, in the inspection chip in which the reaction site is provided on the bottom surface of the well as in the conventional art, there is a problem that the detection accuracy is lowered.

On the other hand, in order to sufficiently supply the liquid such as the reagent to the reaction site and to perform the reaction efficiently, it is necessary to stir the liquid accommodated in the inspection chip. As a general stirring method, stirring by circular movement (hereinafter, referred to as circular movement stirring) is known. FIG. 1 is a schematic diagram for illustrating circular movement of a conventional inspection chip 60x installed on a rotating body 99 of a stirring device. An upper portion of FIG. 1 illustrates a side view of the inspection chip 60x installed on the rotating body 99 of the stirring device when performing the circular movement stirring. A lower portion of FIG. 1 illustrates a schematic diagram of the inspection chip 60x as seen from an opening side thereof when performing the circular movement stirring. Meanwhile, in the lower portion of FIG. 1, for convenience of illustration, the inspection chip 60x is indicated by a straight line, and movement trajectories of a tip end 66b of the inspection chip 60x which is in contact with the rotating body 99 to receive the circular movement of the rotating body 99 are indicated by broken lines.

In the circular movement stirring, one end on the opening side of the inspection chip 60x is fixed by a fixing member not illustrated, and the other end on the bottom surface side of the inspection chip 60x is installed on the rotating body 99 of the stirring device as illustrated in FIG. 1, then, the inspection chip 60x is circularly moved along with the rotating body 99 which performs the circular movement. In the conventional well-type inspection chip 60x (for example, test tube and the like), the inspection chip 60x has a symmetrical structure, and the center of gravity G1 in a state in which the liquid such as the reagent is accommodated and the tip end 66b in contact with the rotating body 99 to receive the circular movement of the rotating body 99 are located on the same axis in a length direction (vertical direction in FIG. 1) of the inspection chip 60x, so that, as illustrated in the lower portion of FIG. 1, both exhibit the same movement trajectory and the inspection chip 60x may perform stable circular movement along with the circular movement of the rotating body 99.

However, if the reaction site is to be provided in a position other than the bottom surface of the well in order to solve the above-described problem that the detection accuracy is lowered occurring when the inspection chip provided with the reaction site on a bottom surface of the well is used, it is also necessary to move the dielectric member and the like along with this, and the structure of the inspection chip becomes asymmetric. For example, a case of using the inspection chip including the reaction site on a side surface thereof is herein described.

FIG. 2 is a schematic diagram for illustrating circular movement of an inspection chip 60y installed on the rotating body 99 of the stirring device including time reaction site on a side surface thereof. An upper portion of FIG. 2 illustrates a side view of the inspection chip 60y installed on the rotating body 99 of the stirring device when performing the circular movement stirring. A lower portion of FIG. 2 illustrates a schematic diagram of the inspection chip 60y as seen from an opening side thereof when performing the circular movement stirring. Meanwhile, in the lower portion of FIG. 2, for convenience of illustration, the inspection chip 60y is indicated by a straight line, and movement trajectories of a tip end 66b of the inspection chip 60y which is in contact with the rotating body 99 to receive the circular movement of the rotating body 99 and the center of gravity G2 of the inspection chip 60y in a state of accommodating the liquid such as the reagent are indicated by broken lines.

As illustrated in FIG. 2, in the inspection chip 60y including the reaction site on the side surface thereof, the inspection chip 60y has an asymmetrical structure, and the center of gravity G2 in a state in which the liquid such as the reagent is accommodated and the tip end 66b of the inspection chip 60y in contact with the rotating body 99 to receive the circular movement of the rotating body 99 are located on the same axis in a length direction (vertical direction in FIG. 2) of the inspection chip 60y so as to be spaced apart from each other, so that, as illustrated in the lower portion of FIG. 2, both exhibit different movement trajectories and the circular movement of the inspection chip 60y is affected by this and becomes unstable. Specifically, the inspection chip 60y might fall from the stirring device. Also, even in a case where the inspection chip 60y does not fall from the stirring device, the liquid such as the reagent in the inspection chip 60y cannot be efficiently stirred, and there is a possibility that the liquid such as the reagent in the inspection chip 60y does not form a so-called vortex even if the stirring is performed and it cannot be expected that the liquid such as the reagent is sufficiently supplied to the reaction site.

That is, in the conventional technology, it was not possible to simultaneously realize further improvement in detection accuracy of the substance to be detected and stable and efficient stirring.

Solution to Problem

An inspection chip according the present invention is an inspection chip accommodating liquid therein for stirring the liquid by circular movement of a bottom surface end, the inspection chip including a well main body for accommodating the liquid, and a side wall member arranged on a side surface of the well main body, in which the bottom surface end of the well main body includes a bottom surface structure in contact with a rotating member for allowing the bottom surface end to perform the circular movement in a position leaning from a center line of the well main body toward the side wall member.

An inspection system according to the present invention is an inspection system using the inspection chip according to the present invention, the system including a light source which emits light to the inspection chip, a detection unit for measuring light to be measured emitted from the inspection chip, and a stirring device including the rotating member.

Advantageous Effects of Invention

According to the present invention, it is possible to simultaneously achieve further the improvement in detection accuracy of the substance to be detected and the stable and efficient stirring.

DESCRIPTION OF EMBODIMENTS

Hereinafter, a mode for carrying out the present invention is described with reference to the drawings. This embodiment is a biochemical inspection system adopting a continuous mode in which a plurality of measurement units for performing respective steps forming one inspection is sequentially arranged in a production line, capable of substantially simultaneously performing a plurality of inspections by sequentially introducing a plurality of inspection chips while the respective steps are sequentially performed and the inspection progresses by progress of the inspection chip along the production line. However, the present invention is not limited to the continuous mode. For example, it is also possible to adopt a non-continuous mode in which the respective steps forming one inspection are performed in the same position, and the progress of the inspection is not dependent on the progress of the inspection chip.

Meanwhile, although a method using SPFS as a biochemical inspection is adopted in this embodiment, the present invention is not limited to the method using the SPFS. For example, methods such as surface plasmon resonance (SPR), general fluorescence immunoassay and the like may also be adopted. A type and a mode of the inspection are not limited, and in a case where it is necessary to use an asymmetric inspection chip, an effect of simultaneously realizing further improvement in detection accuracy of a substance to be detected and stable and efficient stirring may be obtained.

(Biochemical Inspection System)

Figure 1:
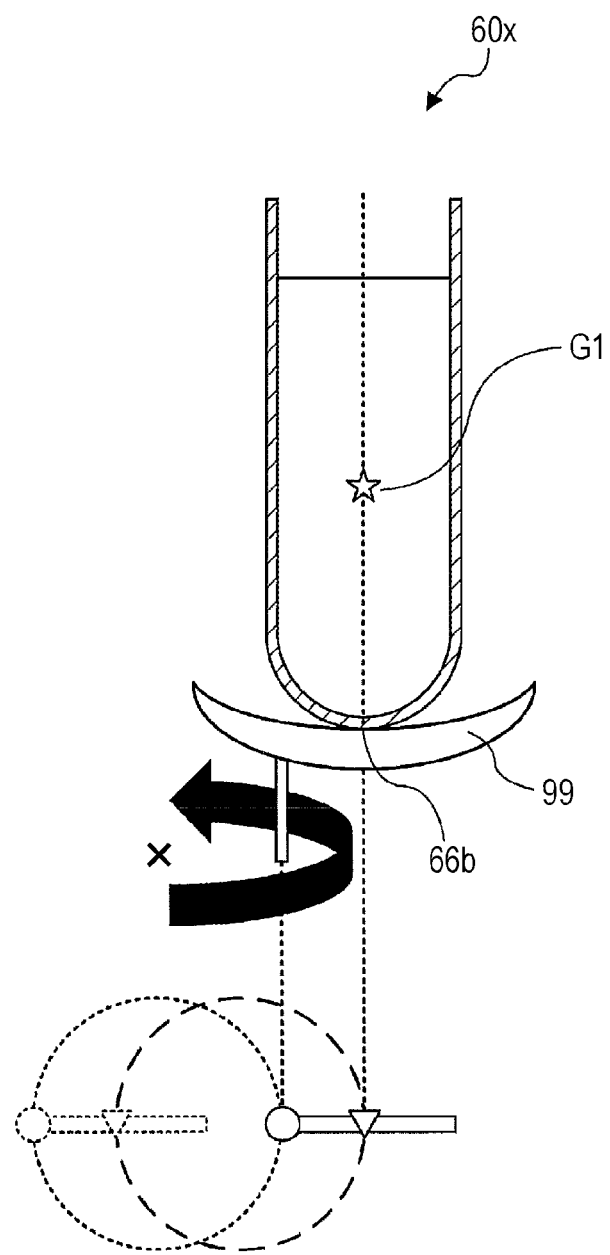
FIG. 1 is a schematic diagram for illustrating circular movement of a conventional inspection chip installed on a rotating body of a stirring device.
Figure 2:
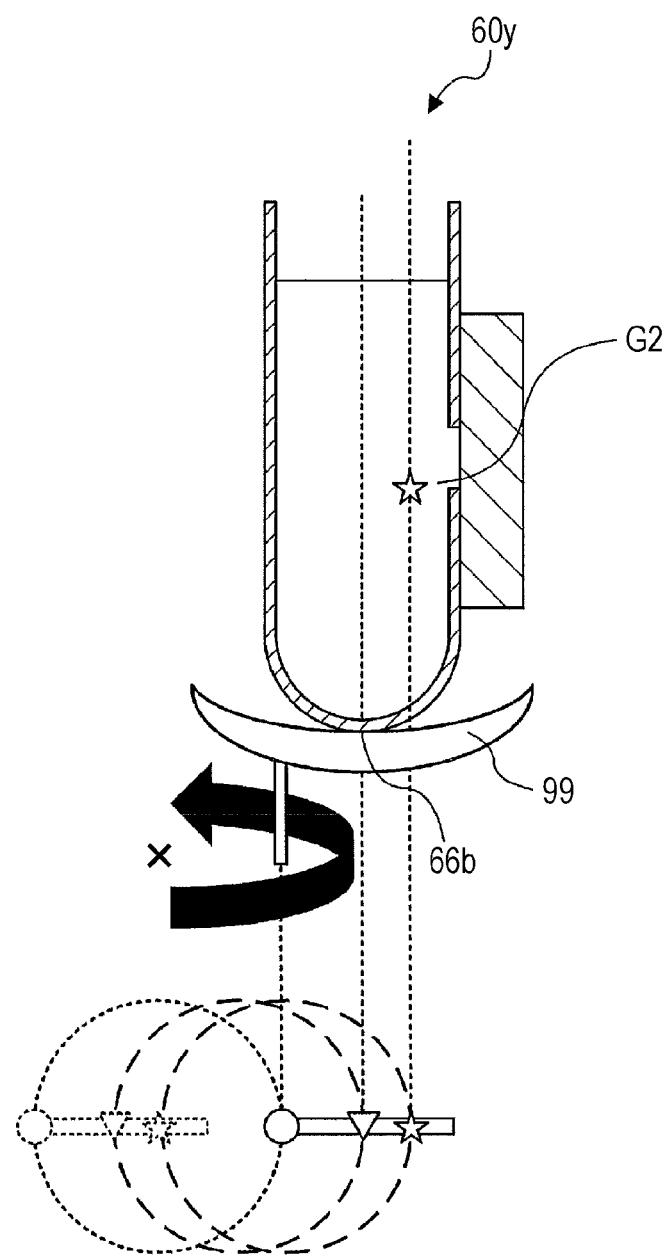
FIG. 2 is a schematic diagram for illustrating circular movement of a conventional inspection chip installed on the rotating body of the stirring device including a structure on a side surface thereof.
Figure 3:
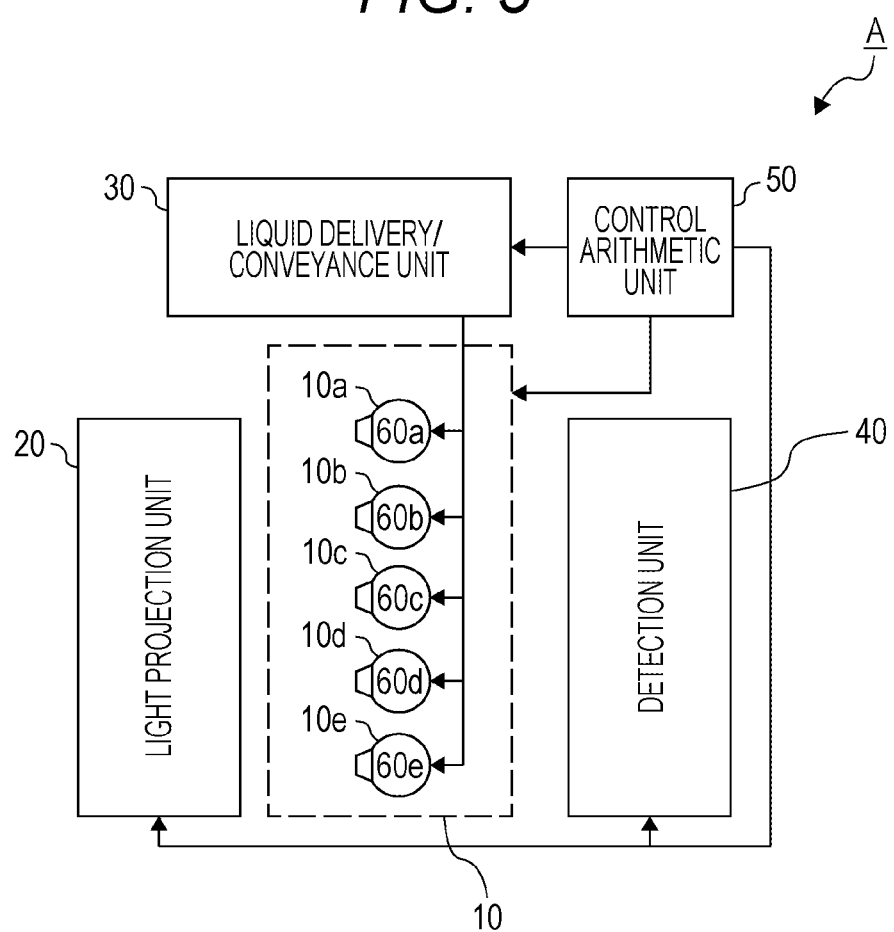
FIG. 3 is a schematic diagram illustrating a configuration of a biochemical inspection system.

FIG. 3 is a schematic diagram illustrating a configuration of a biochemical inspection system A according to this embodiment. The biochemical inspection system A is a system for performing the biochemical inspection using the SPFS. Specifically, the biochemical inspection system A captures a substance to be detected by a first capturing body immobilized on a metal film and labels the substance to be detected with fluorescence by binding a second capturing body labeled with fluorescence by a fluorescent substance to the substance to be detected captured by the first capturing body. Thereafter, the metal film is irradiated with excitation light to generate an enhanced electric field based on surface plasmon resonance in the vicinity of the metal film, and fluorescence emitted from the fluorescent substance excited by the enhanced electric field is detected to measure presence or an amount of the substance to be detected.

As illustrated in FIG. 3, the biochemical inspection system A is formed of a vibration unit 10, a light projection unit 20, a liquid delivery/conveyance unit 30, a detection unit 40, and a control arithmetic unit 50, and is configured to irradiate an inspection chip arranged in the vibration unit 10 with the excitation light by the light projection unit 20 to detect fluorescence emitted from the inspection chip by the detection unit 40. A specific configuration of each unit is hereinafter described.

(Vibration Unit)

The vibration unit 10 is provided with stirring devices not illustrated which stir liquid accommodated in inspection chips 60a, 60c, and 60d by rotary vibration in positions 10a, 10c, and 10d corresponding to the inspection chips 60a, 60c, and 60d. The stirring device is arranged in a position not interfering with an optical path of the excitation light, fluorescence, plasmon scattered light and the like and includes an eccentric rotating body. The rotating body performs the rotary vibration in a contacting state with the inspection chip, thereby applying rotary vibration in a circumferential direction to the inspection chip to stir the liquid accommodated in the inspection chip. However, the stirring device is not limited to that including the eccentric rotating body as long as this may stir the liquid accommodated in the inspection chip by applying the rotary vibration to the inspection chip.

By stirring the liquid accommodated in the inspection chip by the stirring device, reaction, cleaning and the like at each step in the biochemical inspection may be performed efficiently. From the viewpoint of efficiently stirring the liquid in the inspection chip, the stirring device preferably applies the rotary vibration to the inspection chip at an inherent frequency of the inspection chip accommodating the liquid, or at vibration frequencies around the same. It is also possible to apply the rotary vibration to the inspection chip while sequentially switching different inherent frequencies (n-th order inherent frequency and m-th order inherent frequency, n and m being positive integers). Meanwhile, the position in which the stirring device is provided is not limited to the above-described position, and it is also possible to change the installation position or the number as needed or to provide the stirring devices so as to correspond to all the inspection chips according to operational contents and the like at each step.

(Light Projection Unit)

The light projection unit 20 formed of a light source unit and a first angle adjustment unit (both are not illustrated) irradiates the inspection chip with the excitation light.

Figure 4C:
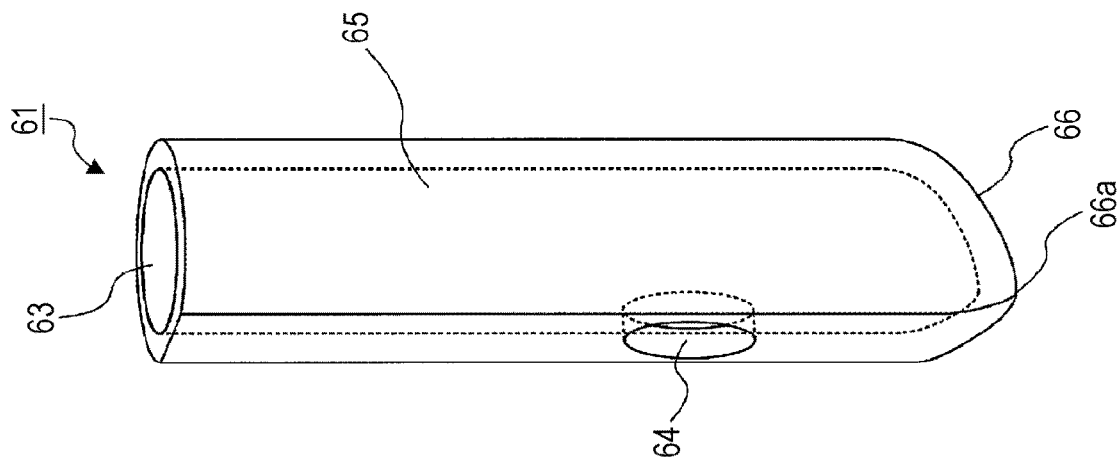
FIG. 4C is a perspective transparent view of the well main body.
Figure 4B:
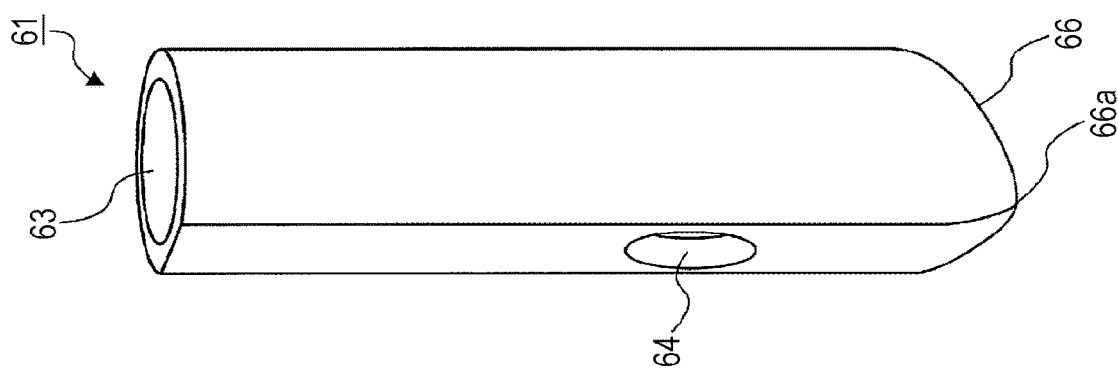
FIG. 4B is a perspective view of a well main body.
Figure 4A:
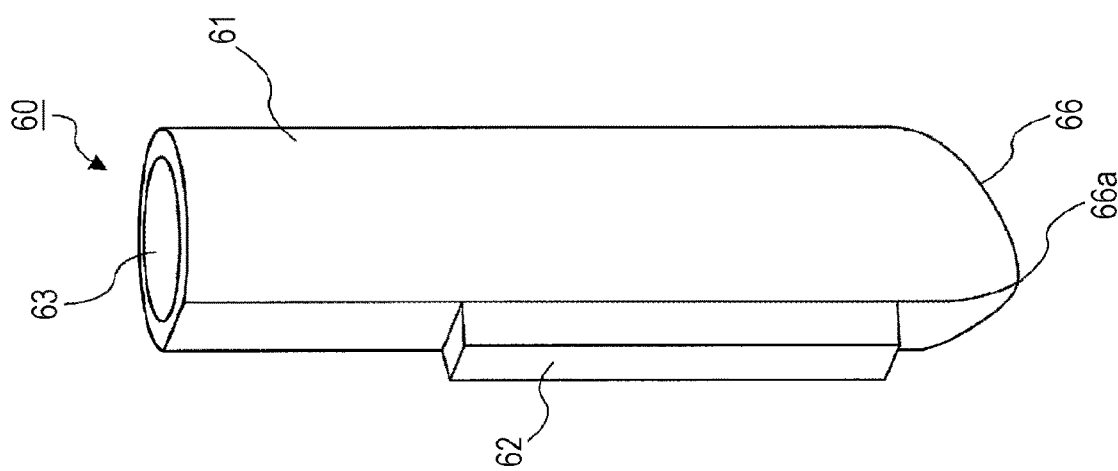
FIG. 4A is a perspective view of an inspection chip.
Figure 5:
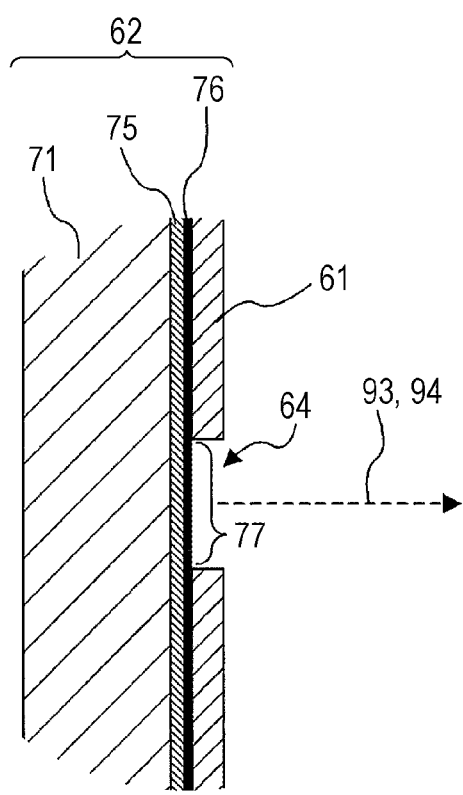
FIG. 5 is a schematic diagram illustrating a structure of a side wall member.

The light source unit formed of a light source, a beam shaping optical system, an APC mechanism, and a temperature adjusting mechanism irradiates the inspection chip with the excitation light. FIGS. 4A to 4C are schematic diagrams illustrating a structure of the inspection chip 60. Although the structure of the inspection chip 60 is to be described later in detail, as illustrated in FIG. 4A, the inspection chip 60 is formed of a well main body 61 and a side wall member 62, and as illustrated in FIGS. 4B and 4C, a second opening 64 is provided on a side wall of the well main body 61 adjacent to the side wall member 62. FIG. 5 is a partially enlarged cross-sectional view of the vicinity of the second opening 64 in a cross-section in a height direction (vertical direction in FIG. 4) of the inspection chip 60, a schematic diagram illustrating a structure of the side wall member 62. Although the structure of the side wall member 62 is to be described later in detail, as illustrated in FIG. 5, the side wall member 62 is formed of a prism 71, a metal film 75, and a capturing film 76, and the capturing film 76 is exposed in the second opening 64 to form a reaction site 77.

Figure 6:
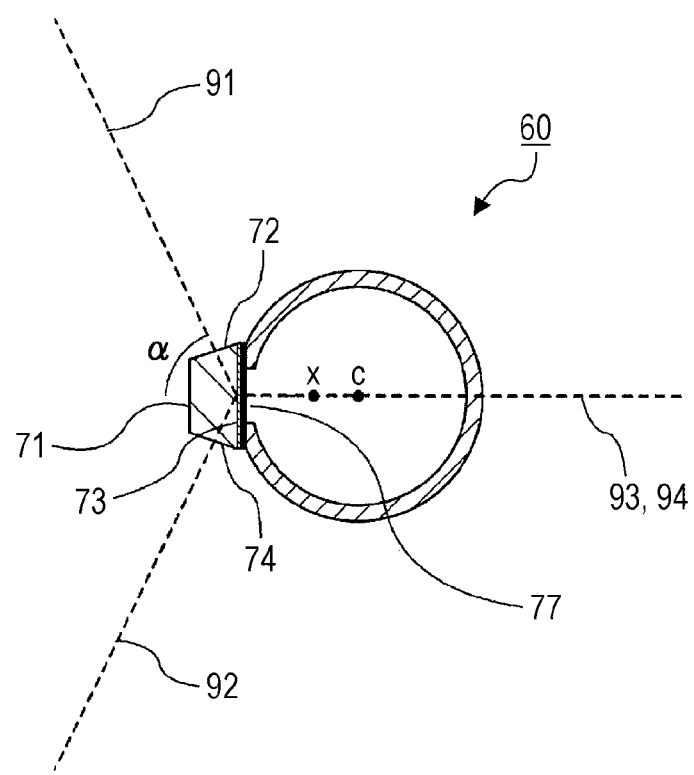
FIG. 6 is a schematic diagram when the inspection chip is seen from a first opening side.

FIG. 6 illustrating a cross-section of the inspection chip 60 is a schematic diagram illustrating light incident on the inspection chip 60 and light emitted from the inspection chip 60. As illustrated in FIG. 6, the light source unit irradiates the prism 71 of the inspection chip 60 with excitation light 91 having constant wavelength and light amount such that a shape of an irradiation spot on a reflective surface 73 of the prism 71 is substantially circular. A size of the irradiation spot is preferably smaller than the reaction site 77.

A type of the light source is not especially limited, and is, for example, a laser diode (LD). Other examples of the light source include a light emitting diode, a mercury lamp, and other laser light sources. In a case where the light emitted from the light source is not a beam, the light emitted from the light source is converted into the beam by a lens, a mirror, a slit and the like. Also, in a case where the light emitted from the light source is not monochromatic light, the light emitted from the light source is converted into the monochromatic light by a diffraction grating and the like. Furthermore, in a case where the light emitted from the light source is not linear polarized light, the light emitted from the light source is converted into the linear polarized light by a polarizer and the like.

The beam shaping optical system is formed of, for example, a collimator, a band pass filter, a linear polarization filter, a half wavelength plate, a slit, a zoom means and the like. However, the beam shaping optical system may also be formed to include only a part of them. The collimator collimates the excitation light emitted from the light source. The band pass filter makes the excitation light emitted from the light source narrow band light having only a central wavelength. This is because the excitation light emitted from the light source has a slight wavelength distribution width. The linear polarization filter makes the excitation light emitted from the light source completely linear polarized light. The half wavelength plate adjusts a polarization direction of the excitation light so that a P wave component is incident on the reflective surface 73. The slit and zoom means adjust a beam diameter, a contour shape and the like of the excitation light so that the shape of the irradiation spot on the reflective surface 73 becomes a circle of a predetermined size.

The APC mechanism controls the light source so that an output of the light source is constant. Specifically, the APC mechanism detects a light amount of light branched from the excitation light by a photodiode or the like, and controls input energy by a recurrent circuit to control the output of the light source constant.

The temperature adjusting mechanism is, for example, a heater, a Peltier element and the like. The wavelength and energy of the light emitted from the light source might fluctuate depending on temperature, so that the temperature adjusting mechanism maintains the temperature of the light source constant, thereby controlling the wavelength and energy of the light emitted from the light source constant.

The first angle adjustment unit relatively rotates an optical axis of the excitation light 91 and the inspection chip 60 to adjust an incident angle $\alpha$ of the excitation light 91 on the reflective surface 73.

For example, the first angle adjustment unit rotates the light source unit about an axis in the height direction of the inspection chip 60 (an axis perpendicular to a paper surface in FIG. 6) to scan the incident angle $\alpha$. As a result, even if the incident angle $\alpha$ fluctuates due to the above-described scanning, the position of the irradiation spot of the excitation light 91 on the reflective surface 73 is maintained with substantially no change.

As described above, when the first angle adjustment unit scans the incident angle $\alpha$ of the excitation light 91, an enhancement angle is specified in the detection unit 40 to be described later. The enhancement angle is an angle being an incident angle when an amount of plasmon scattered light 94 having the same wavelength as that of the excitation light 91 passing through the reflective surface 73 to be emitted on a side of the well main body 61 of the inspection chip 60 is the maximum in a case where the reflective surface 73 is irradiated with the excitation light 91. The enhancement angle is set as the incident angle $\alpha$ of the excitation light 91 at the time of optical blank measurement and fluorescence value measurement to be described later. Meanwhile, an incident condition of the excitation light 91 such as the enhancement angle is roughly determined by design elements of the inspection chip 60 (for example, a material and a shape of the prism 71, a film thickness of the metal film 75, a wavelength of the excitation light 91 and the like), a refractive index of the liquid accommodated in the inspection chip 60 and the like, but this might fluctuate depending on an error in shape of the prism 71, a composition of the liquid accommodated in the inspection chip 60 (for example, a type and an amount of fluorescent substance and the like), so that it is preferable to specify an optimum enhancement angle for each inspection.

(Detection Unit)

The detection unit 40 is formed of a first lens, an optical filter, a second lens, a position switching unit, and a light receiving sensor (all are not illustrated) and detects fluorescence 93 and the plasmon scattered light 94 emitted from the inspection chip 60.

The first lens is, for example, a condensing lens, and condenses light emitted from the vicinity of the reaction site 77. The second lens is, for example, an image forming lens, and forms an image of the light condensed by the first lens on a light receiving surface of the light receiving sensor. An optical path between the first lens and the second lens is a substantially parallel optical path.

The optical filter is arranged on the optical path between the first lens and the second lens by a position switching unit in a case of detecting the fluorescence 93. The optical filter is, for example, a filter including a multilayer film which reflects a predetermined light component, or a color glass filter which absorbs a predetermined light component, and removes an excitation light component such as the excitation light 91 and the plasmon scattered light 94 out of the light condensed by the first lens and guides only the fluorescence 93 to the light receiving sensor. As a result, in the light receiving sensor, the fluorescence 93 may be detected at a high signal (S)/noise (N) ratio. Examples of the optical filter include an excitation light reflecting filter, a short wavelength cutting filter, and a band pass filter.

In a case where the plasmon scattered light 94 is detected, the optical filter is arranged outside the optical path between the first lens and the second lens. In this case, the enhancement angle which is the incident angle when the light amount of the plasmon scattered light 94 is the maximum is specified.

The position switching unit arranges the optical filter on the optical path between the first lens and the second lens or outside the same as needed. Specifically, in a case of detecting the fluorescence 93, the optical filter is arranged on the optical path, and in a case of detecting the plasmon scattered light 94, the optical filter is arranged outside the optical path.

The light receiving sensor detects the fluorescence 93 and the plasmon scattered light 94. The light receiving sensor is, for example, a photomultiplier tube (PMT), an avalanche photodiode (APD) or the like. However, the light receiving sensor is not limited to them, and may be any sensor capable of detecting weak fluorescence 93 and having high sensitivity.

The detection unit 40 may also be configured to detect reflected light 92 of the excitation light 91 instead of detecting the plasmon scattered light 94. For example, this may be configured to detect the reflected light 92 by the above-described light receiving sensor or by a light receiving sensor (for example, a photodiode) for detecting the reflected light separately provided. In this case, when the first angle adjustment unit of the light projection unit 20 scans the incident angle $\alpha$ of the excitation light 91, the detection unit 40 specifies a resonance angle in place of the enhancement angle, and this is set as the incident angle $\alpha$ of the excitation light 91 at the time of the optical blank measurement and the fluorescence value measurement to be described later. The resonance angle is an angle which is the incident angle when the light amount of the reflected light 92 of the excitation light 91 reflected by the reflective surface 73 is the minimum in a case where the reflective surface 73 is irradiated with the excitation light 91. Meanwhile, the resonance angle is in the close vicinity of the enhancement angle.

Also, the light projection unit 20 and the light receiving sensor are arranged at the same height as the inspection chip 60. As a result, the biochemical inspection system may be made compact. However, the light projection unit 20 and the light receiving sensor are not necessarily arranged at the same height as the inspection chip 60. For example, it is also possible to freely change positions of the light projection unit 20 and the light receiving sensor using a mirror or the like.

(Liquid Delivery/Conveyance Unit)

The liquid delivery/conveyance unit 30 is formed of a liquid delivery means and a conveyance means (both are not illustrated). The liquid delivery means supplies liquid such as a reagent to the inspection chip, and recovers the liquid accommodated in the inspection chip as needed. The conveyance means moves the inspection chip to arrange in an appropriate position as needed.

The liquid delivery means is formed of a reagent chip, a pipette unit, and a first moving mechanism (all are not illustrated).

The reagent chip is a container capable of accommodating a sample, a sample diluting solution, a measuring buffer solution, a cleaning solution, a labeling solution for assigning a fluorescent label to the substance to be detected and the like. Types of the sample and the substance to be detected are not especially limited. Examples of the sample include body fluid such as blood, serum, plasma, cerebrospinal fluid, urine, nostril fluid, saliva, and semen, and tissue extracts. Examples of the substance to be detected include nucleic acids (DNA and RNA), proteins (polypeptides, oligopeptides and the like), amino acids, carbohydrates, lipids, and modified molecules thereof. The sample diluting solution includes, for example, bovine serum albumin (BSA), Antifoam SI, $NaN_3$, carboxymethyl-dextran (CMD), human anti-mouse antibodies (HAMA) inhibitor, phosphate buffered saline with Tween 20 (PBST) and the like. The measuring buffer solution includes, for example, BSA, Antifoam SI, $NaN_3$, and PBST. The cleaning solution includes, for example, Antifoam SI, $NaN_3$, and PBST. The labeling solution includes, for example, a secondary antibody labeled with a fluorescent substance and PBST. The reagent chip is usually such that a plurality of containers is arranged according to the type of liquid, or a plurality of containers is integrated.

The pipette unit is formed of a syringe pump and a nozzle. The syringe pump includes a syringe, a plunger capable of reciprocating in the syringe, and a drive mechanism, and sucks or discharges the liquid quantitatively by reciprocating movement of the plunger. The drive mechanism is a means for reciprocating the plunger and is formed of, for example, a stepping motor. One end of the nozzle is connected to the syringe pump. A pipette chip is mounted on the other end of the nozzle not connected to the syringe pump. However, it is also possible to supply the liquid such as the reagent directly into the inspection chip by the nozzle, or to directly recover the liquid accommodated in the inspection chip by the nozzle without using the nozzle.

The first moving mechanism moves the nozzle and arranges the same in a predetermined position. For example, the first moving mechanism freely moves the nozzle in two directions: vertical and horizontal directions. Examples of the first moving mechanism include one formed of a robot arm and a biaxial stage or a turntable which may move up and down.

The conveyance means is formed of an inspection chip holding unit and a second moving mechanism (both are not illustrated).

The inspection chip holding unit is for holding the inspection chip 60, and is fixed to the second moving mechanism or configured to be removable. The second moving mechanism moves the inspection chip holding unit to arrange the inspection chip 60 held by the inspection chip holding unit to appropriate positions as needed such as the positions 10a to 10e corresponding to the respective measurement units which perform the individual steps forming the inspection. Examples of the second moving mechanism include a conveyor and a rotating stage. However, it is not necessary to provide the second moving mechanism in a case of adopting the non-continuous mode to perform the respective steps forming one inspection in the same position without adopting the continuous mode in which a plurality of inspections may be substantially simultaneously performed. For example, it is also possible to configure such that the second moving mechanism is omitted and only the inspection chip holding unit is provided to hold the inspection chip 60. Also, even in a ease of adopting the continuous mode, if it is not necessary to move the inspection chip 60 in accordance with the progress of the inspection, it is also possible to provide a plurality of inspection chips 60 corresponding to the measurement units performing the respective steps forming one inspection and transfer the liquid such as the reagent in the inspection chip 60 to the inspection chip 60 corresponding to a next measurement unit by the liquid delivery means and the like instead of moving the inspection chip 60 after operation in one measurement unit is completed. In this case also, the second moving mechanism may be omitted, and only the inspection chip holding unit is provided to hold each inspection chip 60.

(Control Arithmetic Unit)

Figure 7:
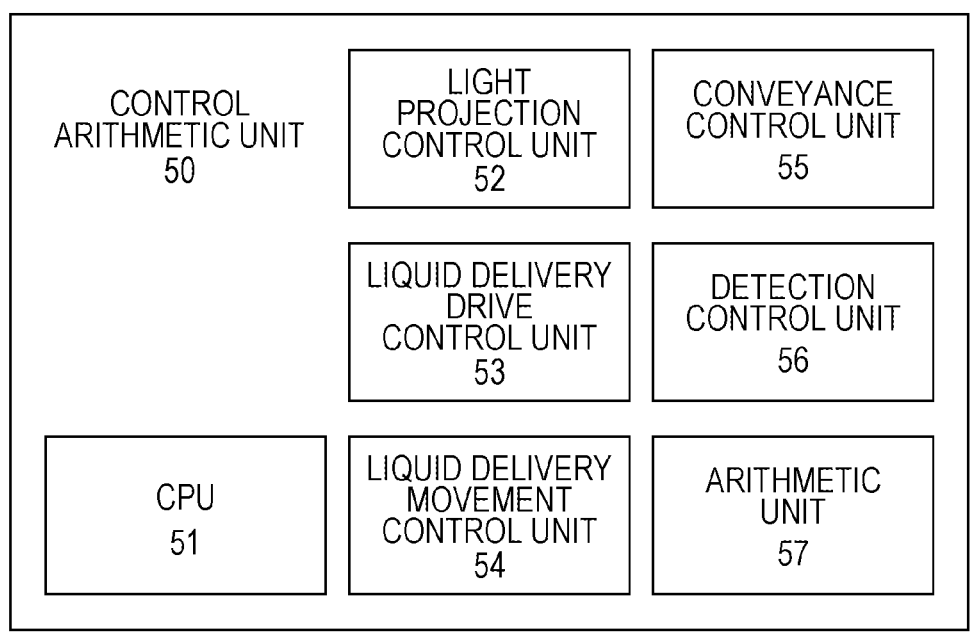
FIG. 7 is a block diagram of a control arithmetic unit.

FIG. 7 is a block diagram of the control arithmetic unit 50. As illustrated in FIG. 7, the control arithmetic unit 50 is formed of a CPU 51, a light projection control unit 52, a liquid delivery drive control unit 53, a liquid delivery movement control unit 54, a conveyance control unit 55, a detection control unit 56, and an arithmetic unit 57.

The CPU 51 controls entire measurement and allows each control unit or arithmetic unit to be described later to operate as needed. The light projection control unit 52 controls the light projection unit 20 and applies the excitation light to a predetermined position. The liquid delivery drive control unit 53 controls the pipette unit of the liquid delivery means of the liquid delivery/conveyance unit 30, and sucks or discharges predetermined liquid by a predetermined amount. The liquid delivery movement control unit 54 controls the first moving mechanism of the liquid delivery means of the liquid delivery/conveyance unit 30 and arranges the nozzle in a predetermined position. The conveyance control unit 55 controls the conveyance means of the liquid delivery/conveyance unit 30, and arranges the inspection chip in an appropriate position as needed. The detection control unit 56 controls the detection unit 40, and detects the plasmon scattered light or fluorescence as needed. The arithmetic unit 57 specifies the enhancement angle on the basis of the light amount of the plasmon scattered light, performs quantitative measurement such as calculation of concentration of the substance to be detected on the basis of the light amount of fluorescence, and performs other correction processing of data and the like.

(Inspection Chip)

FIGS. 4A to 4C are schematic diagrams illustrating a structure of the inspection chip 60. FIG. 4A is a perspective view of the inspection chip 60. As illustrated in FIG. 4A, the inspection chip 60 is formed of the well main body 61 and the side wall member 62. The well main body 61 has a bottomed structure capable of accommodating the liquid.

(Well Main Body)

FIG. 4B is a perspective view of the well main body 61, and FIG. 4C is a perspective transparent view of the well main body 61. As illustrated in FIGS. 4B and 4C, the well main body 61 includes the first opening 63 on one end, the second opening 64 on the side wall adjacent to the side wall member 62, and a bottom surface structure 66 on a bottom surface end opposite to the side of the first opening 63. Also, the well main body 61 is a substantial cylinder in which an outer wall on the side on which the side wall member 62 is arranged is ground to be a flat surface in accordance with a width of the side wall member 62 and the bottom surface end is closed by the bottom surface structure 66. A space in the well main body 61 connected to the first opening 63 and the second opening 64 is a liquid accommodation unit 65 for accommodating the liquid such as the reagent. A shape of the well main body 61 is not limited to the cylinder, and may be, for example, a rectangular tube having a square cross-section or one having an asymmetric cross-section. Especially, in a case where the well main body 61 has a vertically long shape, an effect of simultaneously realizing further improvement in detection accuracy of the substance to be detected and stable and efficient stirring is remarkable. Also, it is sufficient that a shape of the outer wall of the well main body 61 on the side on which the side wall member 62 is arranged may fix the side wall member 62 and this is not limited to the flat surface.

The well main body 61 is formed of a material transparent to light having the wavelength of the excitation light 91 and light having the wavelength of the fluorescence 93, and is formed of, for example, a resin or glass. However, a part of the well main body 61 may be formed of a material opaque to the light having the wavelength of the excitation light 91 and the light having the wavelength of the fluorescence 93 as long as measurement by an inspection method to be described later is not interfered.

Figure 8:
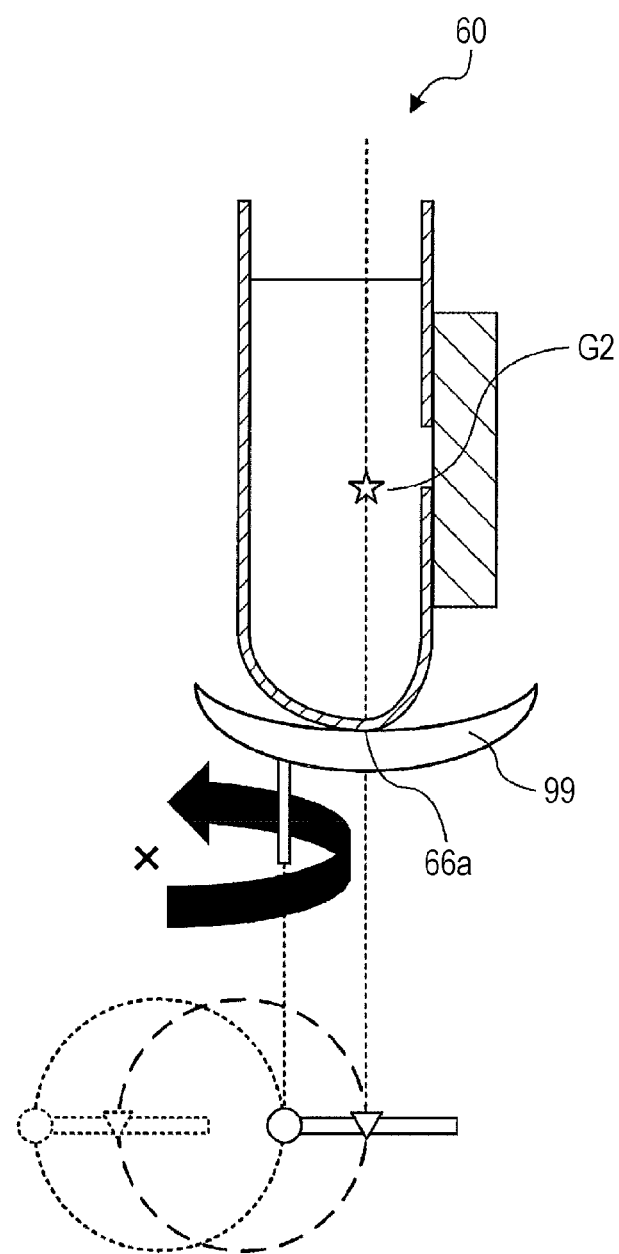
FIG. 8 is a schematic diagram for illustrating circular movement of the inspection chip installed on a rotating body of a stirring device.

The bottom surface structure 66 is a curved surface in which a tip end 66a leans toward the side wall member 62. FIG. 6 is a schematic diagram when the inspection chip 60 is seen from the first opening 63 side. As illustrated in FIG. 6, the tip end 66a is located not at the symmetry center c of the cross-section of the well main body 61 but at a tip end position x leaning from the symmetry center c toward the side wall member 62. The tip end position x and the center of gravity of the inspection chip 60 in a state of accommodating the liquid such as the reagent (hereinafter simply referred to as the "center of gravity of the inspection chip 60") G2 are located on the same axis in a length direction of the inspection chip 60. FIG. 8 is a schematic diagram for illustrating circular movement of the inspection chip 60 installed on a rotating body 99 of the stirring device. An upper portion of FIG. 8 illustrates a side view of the inspection chip 60 installed on the rotating body 99 of the stirring device when the liquid in the inspection chip 60 is stirred. A lower portion of FIG. 8 illustrates a schematic diagram when the inspection chip 60 is seen from the first opening 63 side when the liquid in the inspection chip 60 is stirred. As illustrated in FIG. 8, since the inspection chip 60 and the rotating body 99 are in contact with each other at the tip end 66a, when the tip end 66a is located on the axis in the length direction of the inspection chip 60 where the center of gravity G2 of the inspection chip 60 is present, as illustrated in the lower portion of FIG. 8, the center of gravity G2 of the inspection chip 60 and the tip end 66a perform the circular movement with the same movement trajectory, and the inspection chip 60 may perform stable circular movement with the circular movement of the rotating body 99. Meanwhile, in the lower portion of FIG. 8, for convenience of illustration, the inspection chip 60 is indicated by a straight line, and the movement trajectories of the center of gravity of the inspection chip 60 and the tip end 66a are indicated by broken lines.

As described above, when the inspection chip 60 may perform the stable circular movement, the inspection chip 60 does not fall from the stirring device, so that it becomes possible to efficiently stir the liquid such as the reagent accommodated in the inspection chip 60 by the circular movement and sufficiently supply the liquid such as the reagent to the reaction site to be described later.

The bottom surface structure 66 is not limited to the curved surface, and may be, for example, a pyramid having a tip end at the tip end position x or a flat surface having a protrusion at the tip end position x. That is, it is sufficient that the bottom surface structure 66 is configured to be in contact with the rotating body 99 of the stirring device at the tip end position x to receive the circular movement. Also, from the viewpoint of stability when being mounted on the rotating body 99, the bottom surface structure 66 preferably has the same shape as that of the surface of the rotating body 99 which is in contact.

Also, in this embodiment, the tip end position x and the center of gravity G2 of the inspection chip 60 are located on the same axis in the length direction of the inspection chip 60, but the tip end position x is not limited thereto, and it is sufficient that this leans toward the side wall member 62 from the center position (in this embodiment, the symmetry center c) of the cross-section of the well main body 61. For example, due to a weight and the like of the side wall member 62, it is sometimes impossible to arrange the tip end position x and the center of gravity G2 of the inspection chip 60 on the same axis in the length direction of the inspection chip 60 because of the structure of the inspection chip 60. In such a case, it is not necessary that the tip end position x and the center of gravity G2 of the inspection chip 60 be located on the same axis in the length direction of the inspection chip 60, and if the tip end position x is arranged to lean toward the side wall member 62, it is possible to obtain an effect of making the circular movement of the inspection chip 60 stable and efficiently stirring the liquid such as the reagent accommodated in the inspection chip 60.

Also, as described above, the center of gravity of the inspection chip 60 is exactly the center of gravity of the inspection chip 60 in a state of accommodating the liquid such as the reagent, but it is also possible that the center of gravity of the inspection chip 60 is the center of gravity of the inspection chip 60 itself for the convenience of the manufacture and the like.

(Side Wall Member)

FIG. 5 is a partially enlarged cross-sectional view of the vicinity of the second opening 64 in a cross-section in a height direction (vertical direction in FIG. 4) of the inspection chip 60, a schematic diagram illustrating a structure of the side wall member 62. As illustrated in FIG. 5, the side wall member 62 is formed of the prism 71, the metal film 75, and the capturing film 76, and the capturing film 76 is exposed in the second opening 64 to form the reaction site 77. The side wall member 62 is bonded to the well main body 61 via a bonding layer not illustrated so that the second opening 64 may be closed without leakage of the liquid such as the reagent accommodated in the inspection chip 60. However, the side wall member 62 may also be bonded to the well main body 61 by laser welding, ultrasonic welding, pressure bonding using a clamp member or the like without using the bonding layer.

The prism 71 is an optical element made of a dielectric transparent to the excitation light 91 and has not a little birefringence characteristic. The material of the prism 71 includes the resin and glass and this is preferably the resin having a refractive index of 1.4 to 1.6 and small birefringence.

FIG. 6 is a schematic diagram of the inspection chip 60 as seen from the side of the first opening 63, the schematic diagram illustrating the light incident on the inspection chip 60 and the light emitted from the inspection chip 60. As illustrated in FIG. 6, the prism 71 is a columnar body a bottom surface of which has a trapezoidal shape in which a surface corresponding to one bottom of the trapezoidal shape is the reflective surface 73, a surface corresponding to one leg is an incident surface 72, and a surface corresponding to the other leg is a light emitting surface 74. The excitation light 91 emitted from the light projection unit 20 is incident on the incident surface 72. The prism 71 is configured such that the light passing through the incident surface 72 to enter the prism 71 is reflected by the reflective surface 73, and the reflected light 92 reflected by the reflective surface 73 passes through the emitting surface 74 to emit out of the prism 71. However, the shape of the prism 71 is not limited to the columnar body having the trapezoidal bottom surface, and may be, for example, a triangular prism or a semi-cylinder. Also, it is preferable that the reflective surface 73 is a flat surface.

Also, in a case where the light source of the excitation light 91 is a laser diode (LD), when the excitation light 91 returns to the LD, an excited state of the LD is disturbed, and the wavelength and output of the excitation light 91 fluctuate, so that the incident surface 72 is formed so that the excitation light 91 does not return to the light projection unit 20, and an angle with the reflective surface 73 is set so that the excitation light 91 is not perpendicularly incident on the incident surface 72. In this embodiment, the angle between the incident surface 72 and the reflective surface 73 and the angle between the reflective surface 73 and the emitting surface 74 are both about 80 degrees.

The metal film 75 is formed on the reflective surface 73 of the prism 71. A material of the metal film 75 is not especially limited as long as this is metal capable of causing the surface plasmon resonance. Examples of the material of the metal film 75 include gold, silver, copper, aluminum, and alloys thereof. A method of forming the metal film 75 is not especially limited. Examples of the method of forming the metal film 75 include sputtering, vapor deposition, and plating. Although a thickness of the metal film 75 is not especially limited, this is preferably within a range of 30 to 70 nm.

The capturing film 76 is a region in which the first capturing body which specifically binds to the substance to be detected is immobilized on the metal film 75. A type of the first capturing body is not especially limited as long as this may specifically bind to the substance to be detected. Examples of the first capturing body include an antibody (primary antibody) capable of specifically binding to the substance to be detected or a fragment thereof a nucleic acid, an enzyme and the like.

The reaction site 77 is a region of the capturing film 76 exposed to the liquid accommodation unit 65 of the well main body 61 in the second opening 64. In the reaction site 77, the first capturing body which is immobilized on the metal film 75 and forms the capturing film 76 specifically binds to the substance to be detected present in the sample to selectively capture the substance to be detected. From the viewpoint of detection accuracy, it is preferable that the surface on which the reaction site 77 is formed, that is, the surface of the region of the metal film 75 corresponding to the reaction site 77 in this embodiment is a flat surface. It is also possible to apply a protective layer for maintaining a capturing ability of the first capturing body for a long time on the reaction site 77.

A size of the reaction site 77 is not especially limited. In a case where the capturing film 76 has such a size to close the second opening 64, the size of the reaction site 77 is defined by the second opening 64. As a result, the size of the reaction site 77 may be adjusted easily with a high degree of accuracy. On the other hand, in a case where the capturing film 76 is smaller than the second opening 64, the size of the capturing film 76 directly becomes the size of the reaction site 77.

Also, it is preferable that the reaction site 77 is arranged in a position away from the bottom surface on the bottom surface structure 66 side of the well main body 61. As a result, the liquid such as the reagent in the liquid accommodation unit 65 may be supplied to the reaction site 77 to perform the reaction efficiently. Also, when detecting the fluorescence 93, it is possible to prevent the detection accuracy from being lowered by noise caused by the bottom surface on the bottom surface structure 66 side of the well main body 61.

(Operation of Biochemical Inspection System)

Figure 9:
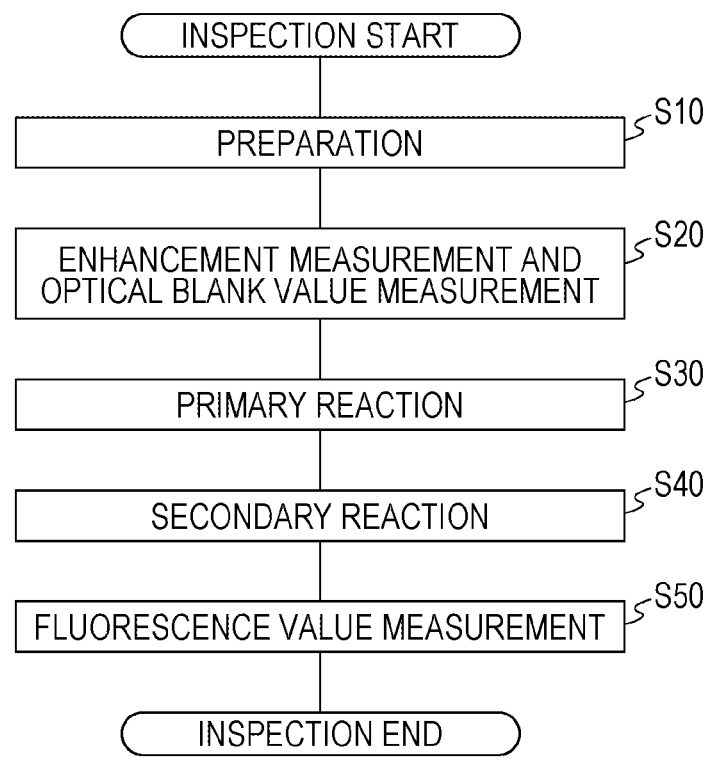
FIG. 9 is a flowchart for illustrating operation of the biochemical inspection system.

FIG. 9 is a flowchart for illustrating operation of the biochemical inspection system A. The operation of the biochemical inspection system A is described with reference to FIG. 9.

First, preparation for measurement is performed (step S10). Specifically, by control of the control arithmetic unit 50, the liquid delivery/conveyance unit 30 moves a target inspection chip 60 to the position 10*a* of the biochemical inspection system A (refer to FIG. 3), and mount the inspection chip 60 on the rotating body of the stirring device corresponding to the position 10*a*. Then, the cleaning solution is supplied to the inspection chip 60 by the liquid delivery/conveyance unit 30, and the inside of the liquid accommodation unit 65 is cleaned while the vibration unit 10 stirs the liquid in the inspection chip 60. At that time, in a case where the protective layer for maintaining the capturing ability of the first capturing body for a long time is applied on the reaction site 77, the protective layer is also removed. Thereafter, the cleaning solution in the inspection chip 60 is recovered by the liquid delivery/conveyance unit 30, and the measuring buffer solution is newly supplied into the inspection chip 60.

Next, the inspection chip 60 is irradiated with the excitation light, and enhancement measurement for specifying the enhancement angle and optical blank value measurement for measuring an optical blank value are performed (step S20). Specifically, by the control of the control arithmetic unit 50, the liquid delivery/conveyance unit 30 arranges the target inspection chip 60 in the position 10*b* (refer to FIG. 3) of the biochemical inspection system A, and the light projection unit 10 irradiates the region of the reflective surface 73 corresponding to the reaction site 77 of the inspection chip 60 with the excitation light 91 while scanning the incident angle α. At the same time, the detection unit 40 detects the plasmon scattered light 94 emitted to the inside of the inspection chip 60 from the metal film 75 irradiated with the excitation light 91. The control arithmetic unit 50 obtains data including a relationship between the incident angle α of the excitation light 91 and intensity of the plasmon scattered light 94, specifies the incident angle α when the intensity of the plasmon scattered light 94 becomes maximum as the enhancement angle on the basis of the data, and sets the incident angle α of the excitation light 91 to the enhancement angle. Also, the enhancement angle is determined on the order of approximately 0.1 degrees.

Thereafter, by the control of the control arithmetic unit 50, the light projection unit 10 irradiates the region of the reflective surface 73 corresponding to the reaction site 77 of the inspection chip 60 with the excitation light 91 at the incident angle α set to the enhancement angle. At the same time, the detection unit 40 detects the amount of light of the same wavelength as that of the fluorescence 93. The control arithmetic unit 50 records the light amount of the light measured by the detection unit 40 as the optical blank value.

Thereafter, the measuring buffer solution in the inspection chip 60 is recovered by the liquid delivery/conveyance unit 30, and a sample to be measured is newly supplied into the inspection chip 60. Meanwhile, as the sample to be measured, a sample collected directly from an inspection subject may be used, or a sample obtained by diluting the sample directly collected from the inspection subject with the sample diluting solution may be used.

Next, a primary reaction for allowing the substance to be detected present in the sample to bind to the first capturing body exposed to the reaction site 77 is performed (step S30). Specifically, by control of the control arithmetic unit 50, the liquid delivery/conveyance unit 30 moves the target inspection chip 60 to the position 10c (refer to FIG. 3) of the biochemical inspection system A, and mount the inspection chip 60 on the rotating body of the stirring device corresponding to the position 10c. Then, the vibration unit 10 stirs the liquid in the inspection chip 60. At that time, the substance to be detected present in the sample specifically binds to the first capturing body exposed to the reaction site 77, so that this is captured by the first capturing body and remains on the reaction site 77.

After a sufficient time for the reaction elapses, in order to clean the inside of the inspection chip 60, the sample to be measured in the inspection chip 60 is recovered by the liquid delivery/conveyance unit 30, and the cleaning solution is newly supplied into the inspection chip 60. At that time, since the liquid in the inspection chip 60 is continuously stirred by the vibration unit 10, the substance to be detected, impurities and the like which are nonspecifically adsorbed in the inspection chip 60 are removed.

Thereafter, the cleaning solution in the inspection chip 60 is recovered by the liquid delivery/conveyance unit 30, and the labeling solution is newly supplied into the inspection chip 60.

Next, a secondary reaction for assigning the fluorescent label to the substance to be detected captured by the first capturing body is performed (step S40). Specifically, by control of the control arithmetic unit 50, the liquid delivery/conveyance unit 30 moves the target inspection chip 60 to the position 10d (refer to FIG. 3) of the biochemical inspection system A, and mount the inspection chip 60 on the rotating body of the stirring device corresponding to the position 10d. Then, the vibration unit 10 stirs the liquid in the inspection chip 60. The second capturing body labeled with fluorescence is present in the labeling solution, and the second capturing body specifically binds to the substance to be detected at a site different from a site of the substance to be detected specifically binding to the first capturing body, so that the substance to be detected is indirectly labeled with the fluorescence by specifically binding to the second capturing body. Meanwhile, the type of the second capturing body is not especially limited as long as this may specifically bind to the substance to be detected at the site different from the site of the substance to be detected specifically binding to the first capturing body. For example, the second capturing body may be a biomolecule specific to the substance to be detected or a fragment thereof. Also, the second capturing body may be formed of one molecule, or may be a complex formed by binding two or more molecules.

After a sufficient time for the reaction elapses, in order to clean the inside of the inspection chip 60, the labeling solution in the inspection chip 60 is recovered by the liquid delivery/conveyance unit 30, and the cleaning solution is newly supplied into the inspection chip 60. At that time, since the liquid in the inspection chip 60 is continuously stirred by the vibration unit 10, the second capturing body, impurities and the like which are nonspecifically adsorbed in the inspection chip 60 are removed.

Thereafter, the cleaning solution in the inspection chip 60 is recovered by the liquid delivery/conveyance unit 30, and the measuring buffer solution is newly supplied into the inspection chip 60.

Next, the fluorescence value measurement for measuring the fluorescence value from the substance to be detected labeled with the fluorescence is performed (step S50). Specifically, by the control of the control arithmetic unit 50, the liquid delivery/conveyance unit 30 arranges the target inspection chip 60 in the position 10e (refer to FIG. 3) of the biochemical inspection system A, and the light projection unit 10 irradiates the region of the reflective surface 73 corresponding to the reaction site 77 of the inspection chip 60 with the excitation light 91 at the incident angle $\alpha$ set to the enhancement angle. At the same time, the detection unit 40 detects the amount of light of the same wavelength as that of the fluorescence 93. The control arithmetic unit 50 records the light amount of the light measured by the detection unit 40 as the fluorescence value. At that time, when a liquid level of the liquid (measuring buffer solution) in the liquid accommodation unit 65 is close to the position of the reaction site 77, the fluorescence reflected or refracted by the liquid surface might also be detected by the detection unit 40, so that from the viewpoint of detection accuracy, the reaction site 77 is preferably located below the liquid level of the liquid (measuring buffer solution) in the liquid accommodation unit 65 and in a position distant from the liquid level. Therefore, the measuring buffer solution at this step may be supplied by a larger amount than that of the liquid used at other steps.

Thereafter, the inspection chip 60 is disposed by the control of the control arithmetic unit 50, and the control arithmetic unit 50 subtracts the optical blank value obtained at step S20 from the obtained fluorescence value to calculate a signal value correlated with the amount of the substance to be detected. The control arithmetic unit 50 may also further convert the signal value into the amount, concentration and the like of the substance to be detected on the basis of a calibration curve created in advance.

After that, the inspection ends. At above-described steps, the biochemical inspection system A may measure the presence or amount of the substance to be detected in the sample.

Meanwhile, at step S20 described above, the incident angle $\alpha$ of the excitation light 91 is set to the enhancement angle, but the incident angle $\alpha$ of the excitation light 91 may be set to the resonance angle in place of the enhancement angle. In this case, at step S20, the light projection unit 10 irradiates the region of the reflective surface 73 corresponding to the reaction site 77 of the inspection chip 60 with the excitation light 91 while scanning the incident angle $\alpha$. At the same time, the detection unit 40 detects the light amount of the reflected light 92. The control arithmetic unit 50 obtains data including a relationship between the incident angle $\alpha$ of the excitation light 91 and the light amount of the reflected light 92, specifies the incident angle $\alpha$ when the light amount of the reflected light 92 becomes minimum as the resonance angle on the basis of the data, and sets the incident angle $\alpha$ of the excitation light 91 as the resonance angle.

The present application claims priority based on JP 2017-025823 A filed on Feb. 15, 2017. The contents described in the specification and drawings of the application are entirely incorporated herein by reference.

REFERENCE SIGNS LIST

10 Vibration unit
10a, 10b, 10c, 10d, 10e Position
20 Light projection unit
30 Liquid delivery/conveyance unit
40 Detection unit
50 Control arithmetic unit
51 CPU
52 Light projection control unit
53 Liquid delivery drive control unit
54 Liquid delivery movement control unit
55 Conveyance control unit
56 Detection control unit
57 Arithmetic unit
60, 60a, 60b, 60c, 60d, 60e, 60x, 60y Inspection chip
61 Well main body
62 Side wall member
63 First opening
64 Second opening
65 Liquid accommodation unit
66 Bottom surface structure
66a, 66b Tip end
71 Prism
72 Incident surface
73 Reflective surface
74 Emitting surface
75 Metal film
76 Capturing film
77 Reaction site
91 Excitation light
92 Reflected light
93 Fluorescence
94 Plasmon scattered light
99 Rotating body
A Biochemical inspection system
c Symmetry center
x Tip end position
G1, G2 Center of gravity
α Incident angle

The invention claimed is:

1. An inspection chip accommodating liquid therein for stirring the liquid by circular movement of a bottom surface at an end of a well main body, the inspection chip comprising:
the well main body for accommodating the liquid; and
a side wall member arranged on a side surface of the well main body,
wherein the bottom surface end includes a curved bottom surface structure in which a tip of the bottom surface is in contact with a rotating member, and wherein said bottom surface is configured to perform the circular movement about a longitudinal axis offset from a center line of the well main body in a direction toward the side wall member.

2. The inspection chip according to claim 1, wherein the bottom surface structure is formed such that a position in contact with the rotating member is present on an axis on which a center of gravity of an entire inspection chip is present, the axis parallel with the center line.

3. The inspection chip according to claim 1, wherein a shape of the bottom surface structure is a curved surface.

4. The inspection chip according to claim 1, wherein the well main body has a vertically long shape.

5. The inspection chip according to claim 4, wherein the well main body has a tubular shape in which the bottom surface end is closed by the bottom surface structure.

6. The inspection chip according to claim 5, wherein the well main body is a cylinder.

7. The inspection chip according to claim 1, wherein the side wall member includes an optical element.

8. The inspection chip according to claim 7, wherein the side wall member includes a prism.

9. The inspection chip according to claim 8,
wherein the well main body has a through hole on a side surface,
a metal film is formed on one surface of the prism, and
the metal film is exposed inside the well main body in the through hole.

10. The inspection chip according to claim 9, wherein a ligand molecule for capturing a substance to be detected is immobilized on the metal film exposed to the inside of the well main body.

11. An inspection system using the inspection chip according to claim 1, the system comprising:
a light source that emits light to the inspection chip;
a detector that measures light to be measured emitted from the inspection chip; and
a stirring device that includes the rotating member.

12. The inspection system according to claim 11, further comprising:
a conveyer that conveys the inspection chip,
wherein the conveyer conveys the inspection chip and arranges the inspection chip in a predetermined position according to progress of the inspection.

13. The inspection chip according to claim 2, wherein a shape of the bottom surface structure is a curved surface.

14. The inspection chip according to claim 2, wherein the well main body has a vertically long shape.

15. The inspection chip according to claim 2, wherein the side wall member includes an optical element.

16. An inspection system using the inspection chip according to claim 2, the system comprising:
a light source that emits light to the inspection chip;
a detector that measures light to be measured emitted from the inspection chip; and
a stirring device that includes the rotating member.

17. The inspection chip according to claim 3, wherein the well main body has a vertically long shape.

18. The inspection chip according to claim 3, wherein the side wall member includes an optical element.

19. An inspection system using the inspection chip according to claim 3, the system comprising:
a light source that emits light to the inspection chip;
a detector that measures light to be measured emitted from the inspection chip; and
a stirring device that includes the rotating member.

20. The inspection chip according to claim 4, wherein the side wall member includes an optical element.

* * * * *